R. Erarts,
Windlass.
No 756.    Patented May 30, 1838.
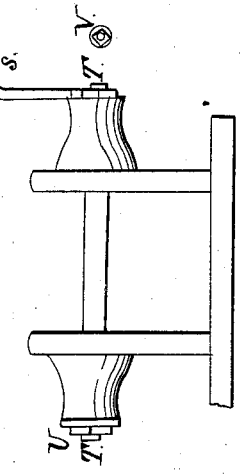
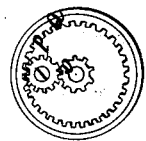
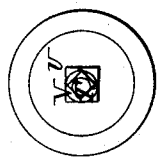
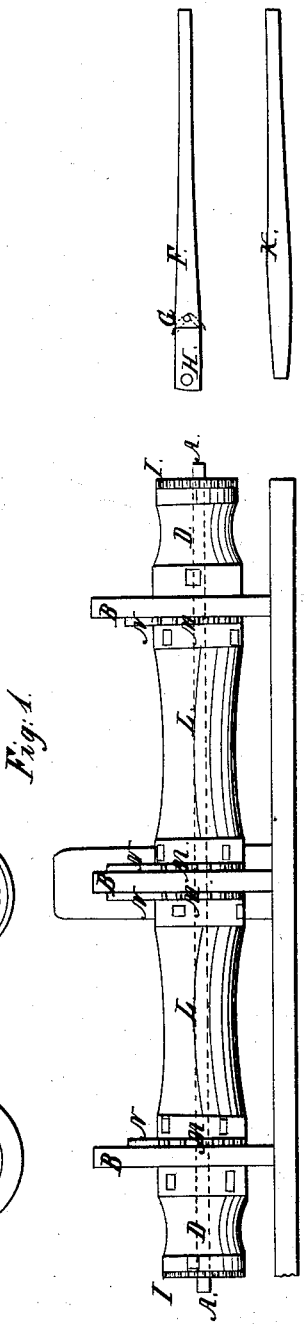

UNITED STATES PATENT OFFICE.

RUSSELL EVARTS, OF MADISON, CONNECTICUT.

WINDLASS.

Specification of Letters Patent No. 756, dated May 30, 1838.

*To all whom it may concern:*

Be it known that I, RUSSELL EVARTS, of Madison, in the county of New Haven and State of Connecticut, have invented a new and useful improvement in windlasses for raising anchors and other heavy bodies and in winches for raising sails and putting in and taking out cargoes and for other purposes, which is described as follows, reference being had to the annexed drawings of the same, making part of this specification.

This improvement consists in placing a metallic cylindrical shaft or axle A, Figure 1, in a horizontal position revolving in metallic boxes, in uprights, standards, or bits B B B, said axle extending beyond the two outside standards to receive a head D secured on the same by bolts, the extremities extending beyond said heads to receive a lever F and pawl G for turning said head and axle.

Each lever is pierced near the end with a round aperture H through which the end of the axle passes. The pawl is placed about one third the length of the lever from the end containing the aperture. It falls into the notches of a cog wheel I, secured on the end of the heads for turning the same with the axle. The heads are likewise mortised to receive common hand spikes K, if preferred, or for the purpose of using these as well as the levers and pawls at the same time.

On the axle between the standards and revolving loosely thereon are placed the barrels L L around which are wound the chains, cables, or ropes. These barrels are boxed in the center with metallic boxes and are mortised on the outside for common hand-spikes and furnished with the usual ratchet wheels M and pawls N, for preventing them from turning back. The pawls are attached to the sides of the standards. On the axle, at each end of the barrel, is fastened a small cog-wheel or pinion O, Fig. 2. This cog-wheel works into another similar cog-wheel P, turning on a pin inserted into the side of the standard. Said last mentioned cog-wheel works into cogs formed around the inside of a large hollow wheel Q, fastened on the end of the barrel and turning with it.

Similar cog-wheels are placed at each end of the barrels, and all of them are placed in recesses or depressions made in the ends of the barrels by which they are protected from the weather.

When a heavy anchor or weight is to be raised the lever is put on the ends of the axle, the pawl of said lever brought into the notches of the ratchet wheel on the end of the hub, the lever depressed which being locked with the ratchet wheel causes the hub and axle to turn, which turns the small cog-wheel fastened on it and this the other small cog-wheel turning on the pin in the standard, and this the large cog-wheel on the end of the barrel which turns the barrel with a slow motion, but a greatly multiplied power, and thus winds up the cable and raises the anchor or weight attached to it. All the cog-wheels and barrels are acted upon in the same manner. The lever is then raised and a new hold taken with the pawl and the operation repeated. The hand spikes may also be used at the same time, or either may be used separately. The motion of the barrels will be the reverse of that of the hubs.

At the commencement of the operation, or when a light strain is required, the hand spikes may be applied directly to the barrel in the usual manner when the motion will be quick but less powerful and the action will of course be similar to the common windlass.

The winch, Fig. 4, which is to be used generally for hoisting sails, discharging cargoes, warping vessels, and for such like purposes, is constructed on a similar principle to that of the windlass above described except that no handspikes or levers are used, but simply a winch S which is applied to the end of the axle T when a slow and powerful action is required; and to the end of the barrel at U where a quick motion is to be obtained. The barrels in this case are secured to the axles by means of washers V screwed on the ends of the axles; and the cog wheels and pawls for preventing the return of the barrel are inside the standard and all the parts of the gearing are protected from the weather as in the windlass.

The invention claimed and desired to be secured by Letters Patent consists in—

The mode of gearing, connecting, and operating the windlass, the respective parts being combined and arranged substantially in the manner described, said parts taken individually being disclaimed.

RUSSELL EVARTS.

Witnesses:
W. BISHOP,
JOB B. WOOD.